Sept. 9, 1969  MASAO SHINOHARA  3,466,546
METHOD FOR MEASURING CHARACTERISTICS EMPLOYING AN A.C. SIGNAL
RESPONSIVE TO IMPEDANCE CHANGE FOR FIXING THE MEASURED VALUE
Filed Oct. 16, 1967  2 Sheets-Sheet 1
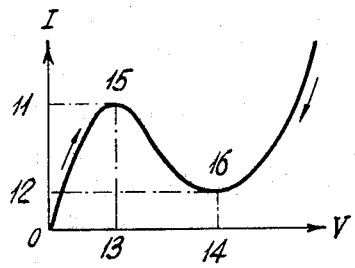
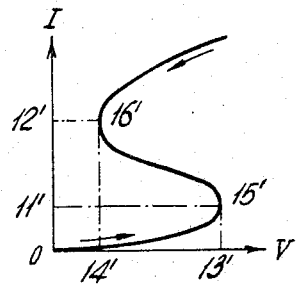
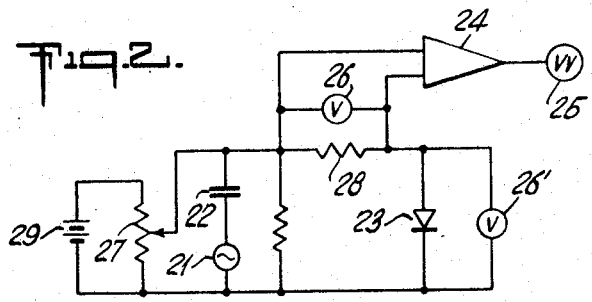
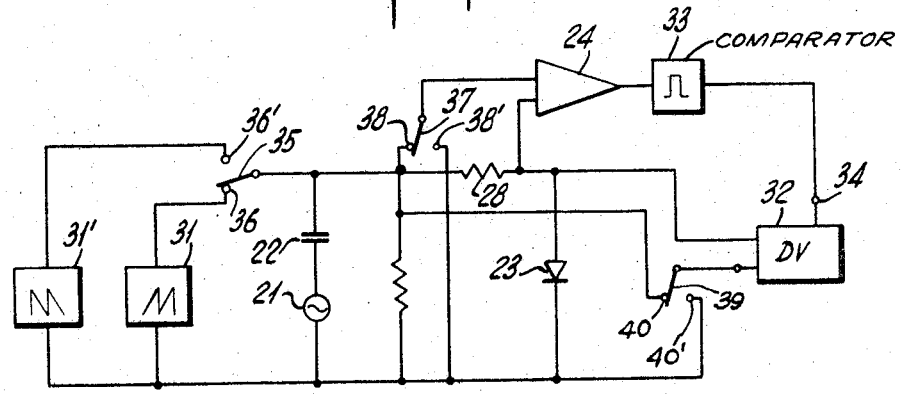
INVENTOR
MASAO SHINOHARA
BY
Hoppood & Calimafde
ATTORNEYS

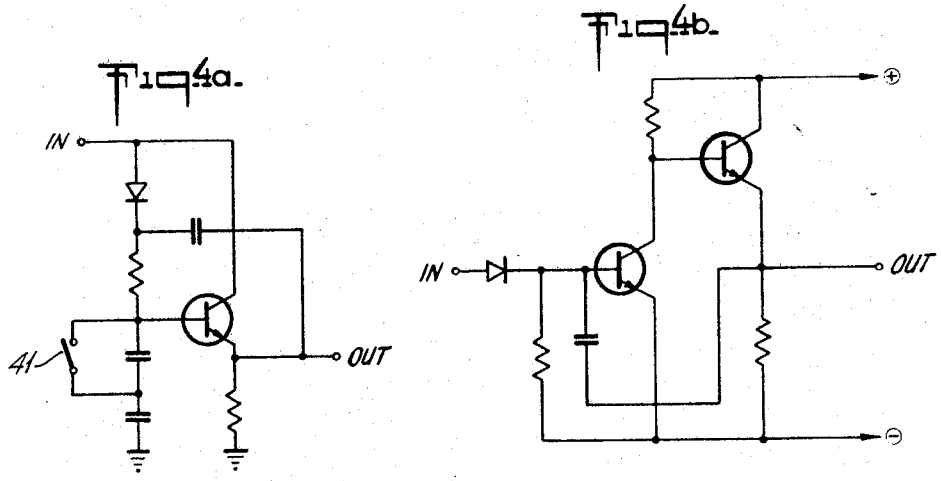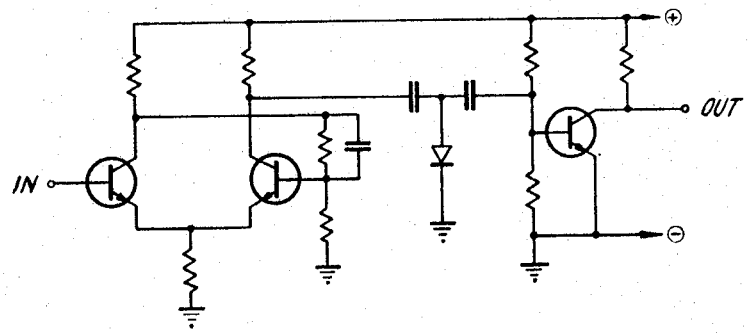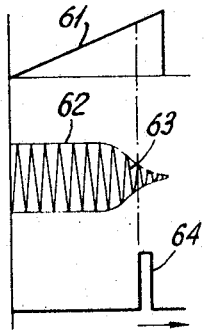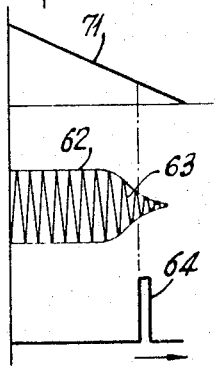

United States Patent Office 3,466,546
Patented Sept. 9, 1969

3,466,546
METHOD FOR MEASURING CHARACTERISTICS EMPLOYING AN A.C. SIGNAL RESPONSIVE TO IMPEDANCE CHANGE FOR FIXING THE MEASURED VALUE
Masao Shinohara, Tokyo, Japan, assignor to Nippon Electric Company Limited, Tokyo, Japan, a corporation of Japan
Filed Oct. 16, 1967, Ser. No. 675,654
Claims priority, application Japan, Oct. 18, 1966, 41/68,520
Int. Cl. G01r 27/00, 19/16
U.S. Cl. 324—158    1 Claim

ABSTRACT OF THE DISCLOSURE

A method for measuring the characteristics of a semiconductor device having a negative resistance, and particularly the measurement of voltage and current values at which an impedance of such a semiconductor device turns to a zero or infinite value in response to a variation in a voltage applied to the device. A sweep signal and a low frequency signal superimposed thereon are applied between two terminals of the device. A measuring instrument is provided for reading a voltage across the terminals or the current through the device. The low frequency signal traces the impedance variation of the device and varies therewith, said impedance being caused to vary by variations in the sweep signal value. The low frequency signal amplitude variations are applied to an amplitude comparator to compare said amplitude with a predetermined value. The comparator generates a stopping pulse when the low frequency signal amplitude exceeds said predetermined value, thereby fixing the indicator position on the measuring instrument. The position of the stopped indicator accurately indicates the value of the voltage or current at which the impedance is the zero or infinite value.

Background of the invention

In certain types of known semiconductor devices having negative resistance, such as the Esaki diode and the binistor, the impedance between the two terminals thereof where the negative resistance appears may have an infinite value. Other devices having negative resistance include the double-base diode, pnpn diode, thyristor, and avalanche injection diode, which may have an impedance of zero value.

Measurement of the values of the voltage and current at which the impedance of the semiconductor device having negative resistance turns to a zero or an infinite value has been carried out with a low-frequency voltage of fixed amplitude superimposed upon a D.C. voltage which is varied by a variable resistor, the resultant voltage being applied to the device to be measured. This is followed by observing the amplitude of the low frequency voltage which indicates the impedance characteristic of the device by means of a low frequency indicator until the zero or infinite value of the impedance is ascertained and then reading out values of the current flowing through and the voltage across said device at the time when the zero or infinite value is ascertained.

In the conventional method of this type, there exists the disadvantage that measurement may be inaccurate because increase and decrease of the D.C. voltage and reading out of the low frequency indicator depend on personal manipulation and personal sense of sight, both of which are inherently subject to personal differences. Furthermore, the measurement takes a comparatively long time.

Objects of the invention

It is an object of this invention to provide a method and an apparatus for measuring accurately and automatically the voltage and current values at the zero and infinite impedance points of a semiconductor device.

All of the objects, features and advantages of this invention and the manner of attaining them will become more apparent and the invention itself will be best understood by reference to the following description of the invention taken in conjunction with the accompanying drawing.

Brief description of the drawing

FIGS. 1a and 1b show, respectively, the static characteristic of one example of a semiconductor device having a negative resistance to be measured by the method of the present invention, FIG. 2 is a circuit diagram used in a conventional method of measuring the characteristic of a semiconductor device having a negative resistance, FIG. 3 is a circuit diagram according to an embodiment of the present invention, FIGS. 4a and 4b are, respectively, circuit diagrams illustrating one example of the saw tooth wave generators shown by blocks in FIG. 3, FIG. 5 is a circuit diagram illustrating one example of an amplitude comparison circuit indicated in block form in FIG. 3, and FIGS. 6 and 7 are, respectively, voltage vs. time characteristics at points in the circuit of FIG. 3.

Summary of the invention

According to this invention, both a sweep signal, such as a saw tooth wave, a pulsating wave, or a triangular wave, and a low frequency signal superimposed thereon, are applied between two terminals of a semiconductor device to be measured, between which a negative resistance may appear. The sweep signal serves to bias the semiconductor device. A voltage between the two terminals of the semiconductor device or a current flowing through the device, which is caused by application of the sweep signal, is measured by such a measuring instrument so that an indication thereof can be fixed by a stopping pulse applied thereto. The low frequency signal is used to trace an impedance value at each bias point of the semiconductor device. The amplitude of the low frequency signal varies in response to a variation in the impedance of the semiconductor device, which impedance variation is in turn caused by the varying bias potential due to the sweep signal. The low frequency signal with the varying amplitude is taken out and is applied to an amplitude comparison device to compare the amplitude of the low frequency signal with a predetermined value. The amplitude comparison circuit generates the stopping pulse whenever the amplitude of the low frequency signal taken out exceeds the predetermined value.

The stopping pulse thus generated is fed to the measurement instrument, thereby fixing the indication on the instrument at the time it indicates precisely the desired value. Since the amplitude of the low frequency signal abruptly becomes quite small (or large) when the impedance of the semiconductor device turns to the infinite value (or zero value), the fixed indication of the instrument indicates the value of the voltage or current at which the impedance turns to the infinite value (or zero value), if the predetermined value is set to be properly small (or large) in the amplitude comparison device. The amplitude of the low frequency signal should be small compared with the bias voltage. The time period of the sweep signal should be as long as possible compared with that of the low frequency signal, so that the low frequency signal may sufficiently trace the impedance variation and so that the measurement may be carried out with accuracy.

Thus, the automatic measuring method of this invention has the following features:

(1) Use of the sweep signal for biasing the semiconductor device with a successively varying potential, instead of the conventional hand-operated variable resistor in conjunction with a direct current power source;

(2) Use of a measurement instrument whose indication is fixed by an applied stopping pulse;

(3) Use of an amplitude comparison device which generates a stopping pulse to stop the indication of the measurement instrument when the impedance of the semiconductor device turns to an infinite value or a zero value.

Inasmuch as the measurement is automatically performed by the above means (1)–(3), one can perform the measurement more quickly and efficiently and without making error. The above mentioned features of this invention will be more clearly understood by the following detailed description of a conventional method and preferred embodiments of the measuring method according to this invention in conjunction with the accompanying drawing.

Description of preferred embodiments

FIGS. 1a and 1b are graphs of currents flowing through semiconductor devices having negative resistance as a function of terminal voltages appearing across the terminals of these devices. Referring more specifically now to FIG. 1a, there is shown a voltage-current characteristic of an Esaki diode, one of the semiconductor devices which may have an impedance of infinite value. As shown, the resistance of an Esaki diode changes from positive to negative and from negative to positive again at peak and valley points 15 and 16, respectively, as the terminal voltage increases. At the peak and the valley points, the impedance of an Esaki diode turns to the infinite value.

The characteristic of FIG. 1b is for a pnpn diode, one of the semiconductor devices whose impedance may become zero value, wherein the resistance changes from positive to negative and vice versa at peak and valley points 15′ and 16′, i.e. the zero impedance points, respectively, as the current increases. The values of currents and voltages at the peak and valley points 15, 15′ and 16, 16′ are hereinafter called peak point current values 11, 11′, peak point voltage values 13, 13′, valley point current values 12, 12′, and valley point voltage values 14, 14′.

Referring to FIG. 2, the conventional method for measuring the peak point voltage value, peak point current value, valley point voltage value and valley point current value of an Esaki diode is conducted in the manner now to be described. A D.C. voltage $V_{DC}$ which is supplied by a power source 29 through a variable resistor 27 and a series resistor 28, and a low frequency voltage $V_{AC}$ which is supplied by a low frequency oscillator 21 through the series resistor 28 and a capacitor 22 for rejecting D.C. are superimposed and the resultant voltage is impressed on an Esaki diode 23. The low frequency voltage $V_{AC}$ across the ends of the series resistor 28 is then amplified by means of a low frequency amplifier 24, while gradually increasing the D.C. voltage $V_{DC}$ by adjusting the variable resistor 27, and the peak and valley points are observed by means of a low frequency indicator such as a value voltmeter 25. When the D.C. current $I_{DC}$ is gradually increased along the arrow in FIG. 1 and gets to the neighborhood of the peak point 15, the impedance of the Esaki diode becomes the maximum impedance and a low frequency current flowing in the series resistor 28 is decreased, causing the low frequency wave indicator 25 to indicate minimum. The peak point current $I_P$ can be calculated from the D.C. voltages across the ends of the series resistor 28 and the resistance value of this series resistor, the voltages being read by the D.C. voltmeter 26 at the appropriate time, and obtaining simultaneously the peak point voltage $V_P$ as the value indicated on the D.C. voltmeter 26′ installed in parallel with the Esaki diode 23.

Referring now to FIG. 3, the most desirable measuring apparatus for practicing the method of this invention can be obtained by eliminating the variable resistor 27, the D.C. power source 29, the voltmeters 26, 26′ and the low frequency indicator 25 which have been used in the conventional method as shown in FIG. 2, and providing, instead, saw tooth generators 31, 32′, a digital voltmeter 32 and an amplitude comparison circuit 33 as shown in FIG. 3. The output of the amplitude comparison circuit 33 is connected to a gating input terminal 34 of the digital voltmeter 32.

In FIG. 3, the Esaki diode 23 is again employed as the measured device. The saw tooth generator 31 is operated after connecting a changeover switch 35 to contact side 36, connecting a changeover switch 37 to contact side 38, and also connecting a changeover switch 39 to contact side 40. Then with an increase in voltage of the saw tooth wave 61, as shown in FIG. 6, the D.C. current flowing in the measured diode 23 is increased along the direction of the arrow as indicated in FIG. 1a, and when it gets to the neighborhood of the peak point 15, the amplitude of low frequency voltage 62 as shown in FIG. 6 becomes smaller and when it becomes the predetermined set level 63, the amplitude comparison circuit 33 is caused to generate a trigger pulse 64, thus stopping the digital voltmeter 32. The value of the peak point current $I_P$ can be obtained from the stopped indication value of the digital voltmeter 32 and the resistance value of the series resistor 28. Next, by connecting the switch 39 to contact side 40′, the peak point voltage $V_P$ can be obtained by the same method.

Switch 35 is then connected to contact side 36′, causing the reverse directional saw tooth wave generator 31′ to generate the saw tooth wave 71 as shown in FIG. 7, which is reverse in direction to the saw tooth wave 61 employed in the previous measurement, and by utilizing the voltage of the saw tooth wave 71, it is possible to obtain the valley point current $I_V$ and the valley point voltage $V_V$ by carrying out the measurements for these points by the same procedure. However, in this case, the voltage value of the reverse saw tooth wave 71 is decreased so that the set value 63 of the detected low frequency voltage in FIG. 7 reaches the smallest value again, and so that the indication value of the digital voltmeter 32 is stopped by pulse 64 from the amplitude comparison circuit 33. That is, the impressed voltage $V_{DC}$ of the diode decreases along the downward arrow in FIG. 1 and stops the indication of the digital voltmeter 32 in the neighborhood of the valley point 16 at the predetermined set value 63 in FIG. 7 and the values $I_V$ and $V_V$ are obtained. According to the invention, the values of $I_P$, $V_P$, $I_V$, and $V_V$ can be measured quickly and accurately.

FIGS. 4a and 4b represent examples of the saw tooth wave generators 31 and 31′ of FIG. 3. FIG. 4a represents a forward saw tooth wave generating circuit, the output voltage thereof rising gradually by releasing a short-circuit switch 41, while FIG. 4b represents a reverse saw tooth generating circuit, the output voltage being gradually decreased by a suitable input signal. FIG. 5 shows one example of an amplitude comparison circuit 33 of FIG. 3, for applying a gating input signal to an LM 1420-type digital voltmeter of the Solatron Company of England, which was employed in the device of FIG. 3 utilized for testing this invention.

Moreover, it is possible to carry out a similar measurement to the above embodiment by connecting the switch 37 to the contact side 38′ and modifying the amplitude comparison circuit 33 so as to generate a stopping pulse whenever the amplitude value of the low frequency signal taken out exceeds a predetermined value which is set higher rather than lower.

Further referring to FIGS. 1 and 3, according to this invention, it is possible to measure the values of $I_P$ (11'), $I_V$ (12'), $V_P$ (13'), and $V_V$ (14') of a semiconductor device whose impedance may take zero value, such as that having a characteristic shown in FIG. 1b. For this purpose, there are two methods for measurement as follows:

(1) The same method as the first embodiment described above, except that the predetermined value of the amplitude comparison circuit 33 is made higher and that a stopping pulse is generated by the amplitude comparison circuit when the low frequency signal sent for the low frequency amplifier to the amplitude comparison circuit 33 exceeds the said predetermined value. In this case, the value of the low frequency signal appearing across the series resistor 28 abruptly increases at the moment when the impedance of the semiconductor device turns to zero.

(2) The same method as the first embodiment, except that the switch 37 is connected to the contact side 38'. In this case, a low frequency signal value between the terminals of the semiconductor device decreases suddenly when the impedance of the semiconductor device becomes zero. In this connection the power source which comprises the saw tooth wave generators 31 or 31' may be considered as the current source.

It should be noted that the set value of the amplitude comparison circuit in the above embodiment and its modifications can be previously determined in accordance with the degree of accuracy desired. The method of the present invention is applicable to all semiconductor devices whose impedance may turn to a zero or an infinite value according to the voltage applied thereto.

What is claimed is:
1. A method for indicating values of a voltage or a current at which the impedance of a semiconductor device turns to zero or infinite value in response to a variation in terminal voltage applied across two terminals of said device, said method comprising the steps of:

applying to said two terminals both a sweep signal and an alternating signal superimposed thereon, supplying the terminal voltage or the current flowing through said semiconductor device to means, having indication fixing means, for measuring the value thereof, applying the alternating output signal which varies in response to a variation in the impedance of said device to an amplitude comparison device to compare the amplitude of said output signal with a predetermined value, generating a stopping pulse when the value of said output signal passes said predetermined value, and applying said stopping pulse to said measuring means to fix the indication thereof.

References Cited
UNITED STATES PATENTS

| | | | |
|---|---|---|---|
| 3,058,064 | 10/1962 | Thomas | 324—158 |
| 3,373,356 | 3/1968 | Camenzind | 324—158 |

OTHER REFERENCES

Electronics, "Pulsed Curve Tracer For Semiconductor Testing" (J. I. Pankove), September 1954, pages 172–3.

RUDOLPH V. ROLINEC, Primary Examiner

E. L. STOLARUN, Assistant Examiner

U.S. Cl. X.R.

324—103